United States Patent
Bo et al.

(10) Patent No.: US 11,762,519 B2
(45) Date of Patent: Sep. 19, 2023

(54) FLEXIBLE TOUCH SUBSTRATE, FLEXIBLE TOUCH PANEL, AND FLEXIBLE TOUCH APPARATUS

(71) Applicant: BOE Technology Group Co., Ltd., Beijing (CN)

(72) Inventors: Zewen Bo, Beijing (CN); Tawei Kuo, Beijing (CN); Baofeng Sun, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 89 days.

(21) Appl. No.: 17/630,347

(22) PCT Filed: Apr. 12, 2021

(86) PCT No.: PCT/CN2021/086713
§ 371 (c)(1),
(2) Date: Jan. 26, 2022

(87) PCT Pub. No.: WO2021/213210
PCT Pub. Date: Oct. 28, 2021

(65) Prior Publication Data
US 2022/0276744 A1    Sep. 1, 2022

(30) Foreign Application Priority Data
Apr. 24, 2020    (CN) .......... 202010334027.X

(51) Int. Cl.
*G06F 3/045* (2006.01)
*G06F 3/044* (2006.01)

(52) U.S. Cl.
CPC .. *G06F 3/0446* (2019.05); *G06F 2203/04102* (2013.01); *G06F 2203/04107* (2013.01);
(Continued)

(58) Field of Classification Search
CPC ...... G06F 3/0412; G06F 3/044; G06F 3/0443; G06F 3/0446; G06F 2203/04102;
(Continued)

(56) References Cited

U.S. PATENT DOCUMENTS 10,644,083 B2 * 5/2020 Lee .................. H10K 59/40
10,860,154 B2   12/2020 Li
(Continued)

FOREIGN PATENT DOCUMENTS

| CN | 106816460 A | 6/2017 |
| CN | 109669572 A | 4/2019 |
| CN | 111552404 A | 8/2020 |

*Primary Examiner* — Joe H Cheng
(74) *Attorney, Agent, or Firm* — IPRO, PLLC

(57) ABSTRACT

Provided are a flexible touch substrate, a flexible touch panel, and a flexible touch apparatus. The flexible touch substrate includes: a flexible base, a plurality of light-emitting devices, a touch electrode layer, and a shielding layer. The light-emitting devices are located on the flexible base; the touch electrode layer is located on the side of the light-emitting devices distant from the flexible base; the shielding layer is located between the light-emitting devices and the touch electrode layer; the shielding layer is insulated from the light-emitting devices and the touch electrode layer, the shielding layer comprises a plurality of openings; and light emitted by the light-emitting device can pass through the openings.

19 Claims, 10 Drawing Sheets

(52) U.S. Cl.
CPC ............... *G06F 2203/04111* (2013.01); *G06F 2203/04112* (2013.01)

(58) Field of Classification Search
CPC . G06F 2203/04103; G06F 2203/04107; G06F 2203/04111; G06F 2203/04112
See application file for complete search history.

(56) References Cited

U.S. PATENT DOCUMENTS

| | | |
|---|---|---|
| 11,561,660 B2 * | 1/2023 | Wang .................... G06F 3/0412 |
| 11,650,681 B2 * | 5/2023 | Kim .................... G02F 1/13338 345/174 |
| 2016/0351833 A1 | 12/2016 | Hosoumi et al. |
| 2017/0141169 A1 * | 5/2017 | Sim ........................ H10K 71/00 |
| 2018/0253175 A1 | 9/2018 | Yao |
| 2019/0050104 A1 * | 2/2019 | Na .......................... G06F 3/044 |
| 2020/0168670 A1 * | 5/2020 | Kim .................... H10K 59/1213 |
| 2020/0212139 A1 * | 7/2020 | Baek ..................... H10K 50/11 |
| 2020/0358024 A1 * | 11/2020 | Choi ....................... H10K 71/00 |
| 2021/0005845 A1 * | 1/2021 | Kim ...................... G06F 3/0446 |
| 2021/0126057 A1 * | 4/2021 | Seo ....................... H10K 50/844 |
| 2021/0334504 A1 * | 10/2021 | Lu ........................... H10K 59/38 |
| 2022/0052122 A1 * | 2/2022 | Xianyu ................ H10K 59/122 |

\* cited by examiner

FLEXIBLE TOUCH SUBSTRATE, FLEXIBLE TOUCH PANEL, AND FLEXIBLE TOUCH APPARATUS

CROSS REFERENCE TO RELATED APPLICATIONS

The present application is a US National Stage of International Application No. PCT/CN2021/086713, filed on Apr. 12, 2021, which claims priority to Chinese Patent Application No. 202010334027.X, filed to the China National Intellectual Property Administration on Apr. 24, 2020 and entitled "FLEXIBLE TOUCH SUBSTRATE, FLEXIBLE TOUCH PANEL, AND FLEXIBLE TOUCH APPARATUS", the entire contents of which are incorporated herein by reference.

FIELD

The disclosure generally relates to the technical field of flexible display, in particular to a flexible touch substrate, a flexible touch panel and a flexible touch apparatus.

BACKGROUND

Flexible Multiple Layer On Cell (F-MLOC) technology allows a touch electrode layer to be inside a flexible touch substrate. The flexible touch substrate of this structure is smaller in thickness and narrower in bezel, so that the flexible touch substrate may be easier to bend or even curl and have a better optical display effect. Therefore, the flexible touch substrate is widely used in the field of touch display.

However, in a flexible touch substrate with an F-MLOC structure, the distance between the touch electrode layer and electrodes (such as cathodes) of light-emitting devices is small and is only about 10 μm, resulting in a large load capacitance between the cathodes and the touch electrode layer.

SUMMARY

A flexible touch substrate according to embodiments of the disclosure, includes:
a flexible base substrate;
a plurality of light-emitting devices, on the flexible base substrate;
a touch electrode layer, disposed on a side of the plurality of light-emitting devices facing away from the flexible base substrate; and
a shielding layer, between the touch electrode layer and the plurality of light-emitting devices;
where the shielding layer is insulated from the plurality of light-emitting devices and the touch electrode layer; and the shielding layer comprises a plurality of openings to allow light beams emitted by the plurality of light-emitting devices to pass through the openings.

In some embodiments, in embodiments of the disclosure, the shielding layer is floating.

In some embodiments, in embodiments of the disclosure, the flexible touch substrate further includes: a thin film encapsulation layer covering the plurality of light-emitting devices, where the shielding layer is disposed on a side of the thin film encapsulation layer facing away from the flexible base substrate.

In some embodiments, in embodiments of the disclosure, the flexible touch substrate further includes: a plurality of bridging structures between the touch electrode layer and the thin film encapsulation layer, and a first insulating layer between the touch electrode layer and the bridging structures, wherein
the touch electrode layer comprises: a plurality of touch electrodes, and a part of the touch electrodes in the touch electrode layer are coupled with each other through the plurality of bridging structures; the first insulating layer comprises: a plurality of via holes running through a thickness direction of the first insulating layer; and the plurality of bridging structures are coupled with the touch electrodes through the via holes.

In some embodiments, in embodiments of the disclosure, the shielding layer and the bridging structures are disposed in the same layer and are made of the same material.

In some embodiments, in embodiments of the disclosure, the first insulating layer includes an organic material, and a thickness of the first insulating layer is within a range of 0.5 μm-3 μm.

In some embodiments, in embodiments of the disclosure, the shielding layer is disposed between the thin film encapsulation layer and the bridging structures; and the flexible touch substrate further includes: a second insulating layer between the shielding layer and the bridging structures.

In some embodiments, in embodiments of the disclosure, the shielding layer includes: a transparent conductive material or a metal material.

In some embodiments, in embodiments of the disclosure, the touch electrode layer is of a grid structure, and meshes of the grid structure allow the light beams emitted by the plurality of light-emitting devices to pass through; and an orthographic projection of a pattern of the touch electrode layer on the flexible base substrate and an orthographic projection of a pattern of the shielding layer on the flexible base substrate do not overlap each other.

In some embodiments, in embodiments of the disclosure, the shielding layer is of a mesh structure; and the mesh structure has a plurality of disconnected positions, and the disconnected positions are positions where orthographic projections of grid lines of the grid structure in the touch electrode layer on the shielding layer pass through.

In some embodiments, in embodiments of the disclosure, the shielding layer includes: a plurality of metal rings arranged at intervals; and the plurality of metal rings are located respectively in orthographic projections of meshes of the grid structure in the touch electrode layer on the shielding layer.

In some embodiments, in embodiments of the disclosure, the orthographic projection of the pattern in the shielding layer on the flexible base substrate is located in a gap between two adjacent light-emitting devices of the plurality of light-emitting devices.

In some embodiments, in embodiments of the disclosure, the flexible touch substrate further includes: a buffer layer disposed on a side of the thin film encapsulation layer facing away from the flexible base substrate.

In some embodiments, in embodiments of the disclosure, the flexible touch substrate further includes: a protection layer disposed on a side of the touch electrode layer facing away from the flexible base substrate.

An embodiment of the disclosure further provides a flexible touch panel, including:
any of the above flexible touch substrates;
a polarizer, disposed on a side of a touch electrode layer of the flexible touch substrate facing away from a flexible base substrate; and a transparent cover plate, disposed on a side of the polarizer away from the flexible touch substrate.

An embodiment of the disclosure further provides a flexible touch apparatus, including any of the above flexible touch substrates, or any of the above flexible touch panels.

DETAILED DESCRIPTION

Figure 1:
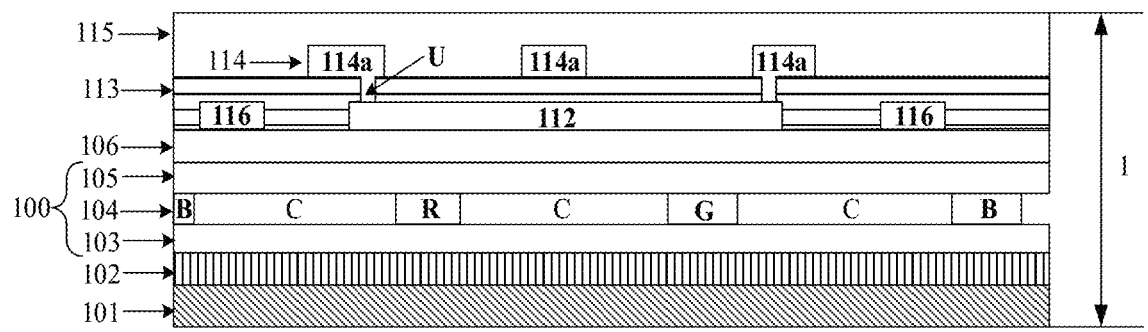
FIG. 1 is a cross-sectional view of a flexible touch substrate according to embodiments of the disclosure.

The disclosure will be further described in detail below with reference to drawings and embodiments. It can be understood that the specific embodiments described here are only used to explain the relevant disclosure, but not to limit the disclosure. In addition, it should be noted that, for ease of description, only parts related to the disclosure are shown in the drawings.

It should be noted that the embodiments in the disclosure and features in the embodiments can be combined with each other if there is no conflict. The disclosure will be described in detail below with reference to the drawings and in conjunction with the embodiments.

In the related art, in a flexible touch substrate with an F-MLOC structure, the distance between a touch electrode layer and electrodes (such as cathodes) of light-emitting devices is relatively small, which is only about 10 μm, resulting in a large load capacitance between the cathodes and the touch electrode layer. The noise signal generated makes a strong interference to a touch signal, which is a great challenge to a subsequent debugging process for touch driving and touch performance, to thereby causing a poor touch effect.

Based on this, embodiments of the disclosure provide a flexible touch substrate, a flexible touch panel, and a flexible touch apparatus to improve a touch effect of the flexible touch substrate.

FIG. 1 is a cross-sectional view of a flexible touch substrate according to embodiments of the disclosure. As shown in FIG. 1, the flexible touch substrate may include:
a flexible base substrate 101;
a plurality of light-emitting devices 100, disposed on the flexible base substrate 101; the light-emitting device 100 include: a first electrode 103, a second electrode 105 disposed on a side of the first electrode 103 facing away from the flexible base substrate 101, and a light-emitting layer 104 between the first electrode 103 and the second electrode 105; in some embodiments, the first electrode 103 is an anode and the second electrode 105 is a cathode; or, the first electrode 103 is a cathode and the second electrode 105 is an anode, which may be set according to actual conditions; in embodiments of the disclosure, the first electrode 103 is the anode and the second electrode 105 is the cathode for description; in addition, the light emitting device 100 may further include: a Hole Inject Layer (HIL) and a Hole Transport Layer (HTL) which are disposed between the first electrode 103 and the light-emitting layer 104, and an Electron Transport Layer (ETL) and an Electron Inject Layer (EIL) which are disposed between the second electrode 105 and the light-emitting layer 104;
a touch electrode layer 114, disposed on a side of the light-emitting devices 100 facing away from the flexible base substrate 101, where a touch electrode in the touch electrode layer is coupled with a drive chip; and
a shielding layer 116, disposed between the light-emitting devices 100 and the touch electrode layer 114. The shielding layer 116 is insulated from the light-emitting devices 100 and the touch electrode layer 114. The shielding layer 116 includes a plurality of openings (not shown in the figure), and light emitted by the light-emitting devices 100 may pass through the openings.

In embodiments of the disclosure, by providing a shielding layer between the light-emitting devices and the touch electrode layer, the shielding layer may shield the second electrode in the light-emitting devices to reduce a load capacitance generated between the second electrode and the touch electrode layer, thereby reducing the interference of a noise signal on a touch signal and improving a touch effect. In addition, the shielding layer includes the plurality of openings, and the light emitted by the light-emitting devices may pass through the openings. Therefore, the shielding layer may not block the light emitted by the light-emitting devices and may not affect the display effect.

In some embodiments, continuing to refer to FIG. 1, the above flexible touch substrate may further include: a drive film layer 102 disposed between the flexible base substrate 101 and the light-emitting devices 100. The drive film layer 102 may include a plurality of switch devices, and the first electrode 103 in the light-emitting devices 100 is coupled with at least one switch device. Thus, the light-emitting devices 100 may be controlled to emit light through the switch device.

In some embodiments, in the above flexible touch substrate provided by embodiments of the disclosure, the above shielding layer may be floating, that is, no signal is applied to the shielding layer. For example, the shielding layer may not be grounded or externally applied with a constant potential. This is because the distance between the shielding layer and the touch electrode layer is generally 0.3 μm-2 μm, as such the distance between the shielding layer and the touch electrode layer is relatively small. If a signal is applied to the shielding layer, for example, applying a constant potential, a load of the touch electrode layer may be too large, so that the charging time is too long, and a load at a farther distance from the drive chip is larger than a load at a closer position, and a phenomenon of uneven capacitance distribution occurs, ultimately resulting in poor touch sensitivity. In addition, when the load of the touch electrode layer is too large, a drive chip with large drive capability is required, resulting in a significant increase in the cost and size of the drive chip.

As shown in FIG. 1, the flexible touch substrate provided by embodiments of the disclosure may further include: a thin film encapsulation layer 106 covering the plurality of light-emitting devices 100. The shielding layer 116 is disposed on a side of the thin film encapsulation layer 106 facing away from the flexible base substrate 101.

The thin film encapsulation layer 106 is configured to isolate moisture and oxygen in the air, prevent moisture and oxygen from corroding the light-emitting devices, prevent a flexible display substrate from aging, and prolong the service life of the flexible display substrate. By disposing the shielding layer 116 on the side of the thin film encapsulation layer 106 facing away from the flexible base substrate 101, the shielding layer 116 may be prevented from affecting an encapsulation effect of the thin film encapsulation layer 106, and thus the moisture and oxygen in the air are prevented from eroding the light-emitting devices.

Continuing to refer to FIG. 1, the above flexible touch substrate provided by embodiments of the disclosure may further include: a plurality of bridging structures 112 disposed between the touch electrode layer 114 and the thin film encapsulation layer 106, and a first insulating layer 113 disposed between the touch electrode layer 114 and the bridging structures 112.

The touch electrode layer 114 includes: a plurality of touch electrodes 114a, and a part of the touch electrodes 114a in the touch electrode layer 114 are coupled with each other through the bridging structures 112.

The first insulating layer 113 includes: a plurality of via holes U running through a thickness direction of the first insulating layer 113. The bridging structures 112 are coupled with the touch electrodes 114a through the via holes U.

Figure 2:
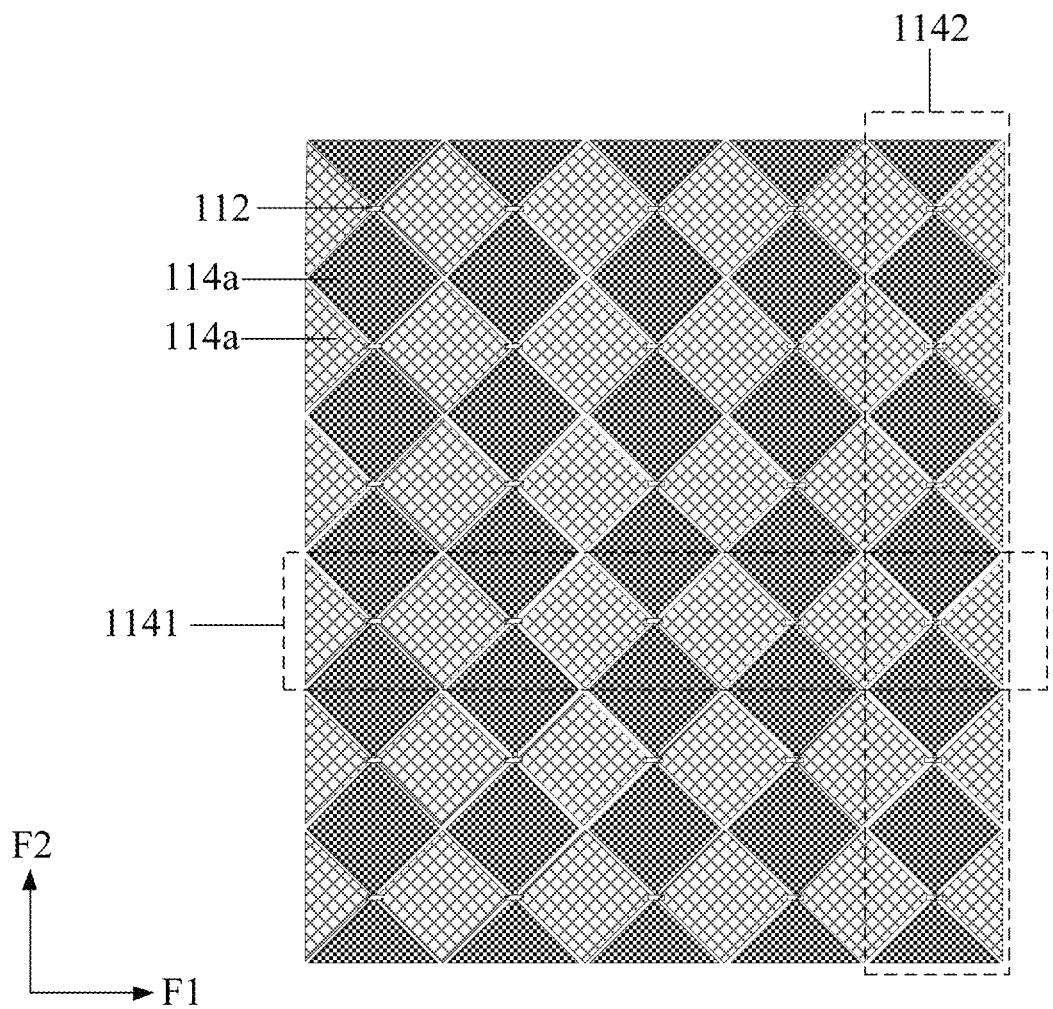
FIG. 2 is a schematic planar structural diagram of a touch electrode layer according to embodiments of the disclosure.

FIG. 2 is a schematic planar structural diagram of the touch electrode layer in embodiments of the disclosure, and FIG. 2 is a bottom view of the flexible base substrate towards the touch electrode layer as shown in FIG. 1, so that the structure of the touch electrode layer may be more clearly illustrated. As shown in FIG. 1 and FIG. 2, the touch electrode layer may include: a plurality of first touch electrodes 1141 extending along a first direction F1, and a plurality of second touch electrodes 1142 extending along a second direction F2. The first direction F1 and the second direction F2 intersect each other. For example, the first direction F1 and the second direction F2 may be perpendicular to each other. Of course, an angle between the first direction F1 and the second direction F2 may also be other values, and is not limited here. The first touch electrodes 1141 and the second touch electrodes 1142 constitute a mutual capacitance structure. Touch positions may be determined by detecting mutual capacitance values at intersections of the first touch electrodes 1141 and the second touch electrodes 1142.

Continuing to refer to FIG. 1 and FIG. 2, the first touch electrodes 1141 include: a plurality of touch electrodes 114a arranged along the first direction F1, and the plurality of touch electrodes 114a in the first touch electrodes 1141 are electrically connected in sequence. The second touch electrodes 1142 include: a plurality of touch electrodes 114a arranged along the second direction F2, and the plurality of touch electrodes 114a of the second touch electrodes 1142 are coupled through the bridging structures 112. A first insulating layer 113 is disposed between the touch electrode layer 114 and the bridging structures 112, and the bridging structures 112 are coupled with the touch electrodes 114a in the second touch electrodes 1142 through via holes U in the first insulating layer 113, thereby avoiding the first touch electrodes 1141 and the second touch electrodes 1142 are short-circuited.

In embodiments of the disclosure, the touch electrode layer adopts the mutual capacitance structure as an example for description. In some embodiments, the touch electrode layer may further adopt a self-capacitance structure, that is, the plurality of touch electrodes in the touch electrode layer may be disposed separately, and touch positions may be detected by detecting a self-capacitance of each touch electrode. The structure of the touch electrode layer may be set according to actual situations, which is not limited here.

In some embodiments, as shown in FIG. 1, in embodiments of the disclosure, the above shielding layer 116 and the bridging structures 112 are disposed in the same layer and are made of the same material. In this way, the same patterning process may be used during the manufacturing process to form patterns of the shielding layer 116 and the bridging structures 112, which saves process steps and manufacturing costs. In addition, by disposing the shielding layer 116 in the same layer as the bridging structures 112, the thickness of the flexible touch substrate may be reduced, and the requirement for lightness and thinness of the flexible touch substrate may be met.

In some embodiments, in embodiments of the disclosure, the above shielding layer may include: a transparent conductive material or a metal material. Of course, the above shielding layer may also be made of other conductive materials, which is not limited here.

In practical application, as shown in FIG. 1, in order to avoid the situation that as the distance between the shielding layer 116 and the touch electrode layer 114 is too small, the load capacitance between the shielding layer 116 and the touch electrode layer 114 is too large, and the touch performance is affected, in embodiments of the disclosure, the first insulating layer 113 is thickened. For example, the thickness of the first insulating layer 113 may be greater than 0.5 μm, or the first insulating layer 113 is made of an insulating material with a low dielectric constant. For example, the dielectric constant of a material of the first insulating layer 113 may be less than 7, so as to reduce the load capacitance between the shielding layer 116 and the touch electrode layer 114.

In some embodiments, the first insulating layer 113 may include an organic material. For example, the material of the first insulating layer 113 may be a photosensitive Over Coat (OC) material with a dielectric constant being about 3.5. The thickness of the first insulating layer 113 may be within the range of 0.5 μm-3 μm. For example, the thickness of the first insulating layer 113 may be about 2 μm. Of course, the first insulating layer 113 may also be made of other materials, which is not limited here. Of course, the first insulating layer 113 may also be made of other materials, and the thickness of the first insulating layer 113 may also be set to other values according to actual needs, which are not limited here.

Figure 3:
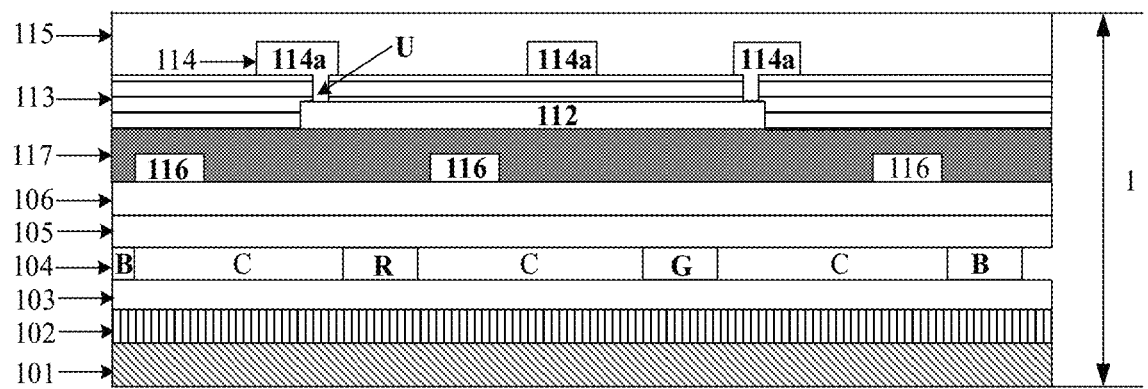
FIG. 3 is another cross-sectional view of a flexible touch substrate according to embodiments of the disclosure.

FIG. 3 is another schematic cross-sectional view of the flexible touch substrate provided by embodiments of the disclosure. As shown in FIG. 3, in another embodiment of the disclosure, the shielding layer 116 is disposed between the thin film encapsulation layer 106 and the bridging structures 112.

The flexible touch substrate 1 may further include: a second insulating layer 117 disposed between the shielding layer 116 and the bridging structures 112.

That is to say, the shielding layer 116 and the bridging structures 112 may also be disposed on different film layers. Besides, the shielding layer 116 and the bridging structures 112 are insulated by the second insulating layer 117 to increase the distance between the shielding layer 116 and the touch electrode layer 114, so that the load capacitance between the shielding layer 116 and the touch electrode layer 114 is reduced, the influence of the shielding layer 116 on the touch signal is reduced, and thus the touch effect is improved.

In some embodiments, a material of the second insulating layer may be an inorganic material, such as a silicon nitride (SiNx) material. When the material of the second insulating layer is the inorganic material, the thickness of the second insulating layer may be within the range of 0.3 µm-0.4 µm. In this way, the manufactured flexible touch substrate may have a small thickness, meeting the requirement for a thin and light flexible touch apparatus carrying the flexible touch substrate. Of course, the material of the second insulating layer may also be an organic material, such as a photosensitive Over Coat (OC) material with a dielectric constant being about 3.5. When the material of the second insulating layer is the organic material, the thickness of the second insulating layer may be about 2 µm. By increasing the thickness of the second insulating layer and using an organic material with a low dielectric constant, the load capacitance between the shielding layer and the touch electrode layer may be reduced, and thus the influence of the shielding layer on the touch electrode layer is further reduced.

In embodiments of the disclosure, the touch electrode layer may be of a grid structure, and light emitted by the light-emitting devices may pass through meshes of the grid structure without affecting the display effect. However, when grid lines in the touch electrode layer overlap shield lines in the shielding layer, the shielding layer forms load capacitances with the touch electrode layer and the second electrode respectively, and there is still a large load capacitance between the touch electrode layer and the second electrode. Therefore, an orthographic projection of a pattern of the touch electrode layer on the flexible base substrate and an orthographic projection of a pattern of the shielding layer on the flexible base substrate do not overlap each other, so it may be ensured that the load capacitance between the touch electrode layer and the second electrode is small, and the interference caused by the second electrode to touch response of the flexible touch substrate may be further reduced.

In some embodiments, the flexible touch substrate includes a plurality of sub-pixels, and each sub-pixel is provided with one light-emitting device described above. Color display may be realized by providing sub-pixels of different colors. In order to explain the pattern of the shielding layer more clearly, arrangement manners of the sub-pixels in embodiments of the disclosure will be described below with reference to the drawings.

Figure 4:
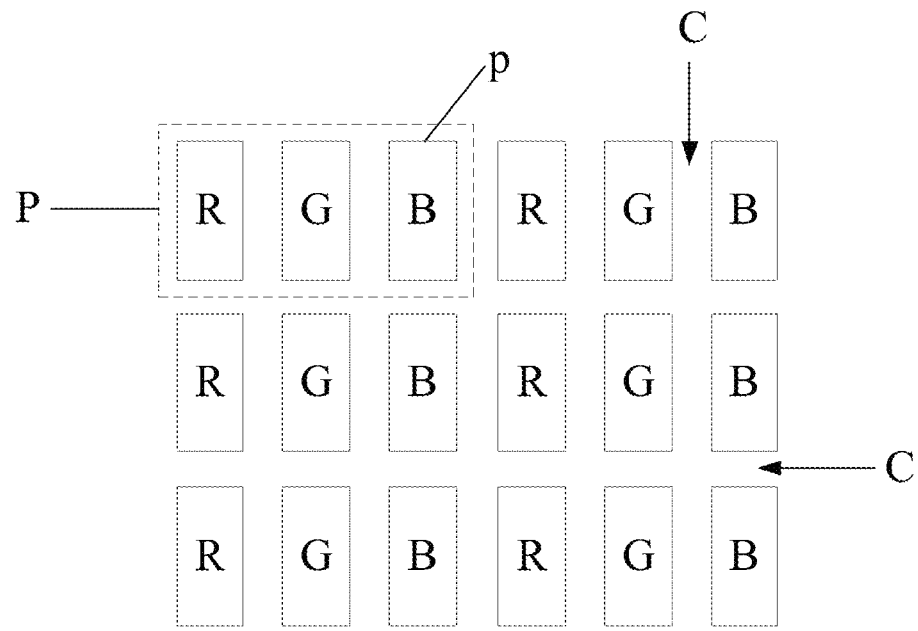
FIG. 4 is a schematic diagram illustrating arrangement of sub-pixels according to embodiments of the disclosure.

FIG. 4 is a schematic diagram of arrangement of the sub-pixels in embodiments of the disclosure. As shown in FIG. 4, the sub-pixels in the above flexible touch substrate may be arranged in parallel. The above flexible touch substrate includes a plurality of pixels P arranged in an array. Each pixel P includes three sub-pixels p, which are respectively a red sub-pixel R, a green sub-pixel G, and a blue sub-pixel B arranged in sequence. In each pixel P, an arrangement order of the red sub-pixel R, the green sub-pixel G and the blue sub-pixel B may be set according to actual needs. For example, the sub-pixels p in each pixel P may also be arranged in the order of the red sub-pixel R, the blue sub-pixel B, and the green sub-pixel G, which is not limited here. There is a sub-pixel gap C between two adjacent sub-pixels p.

Figure 5:
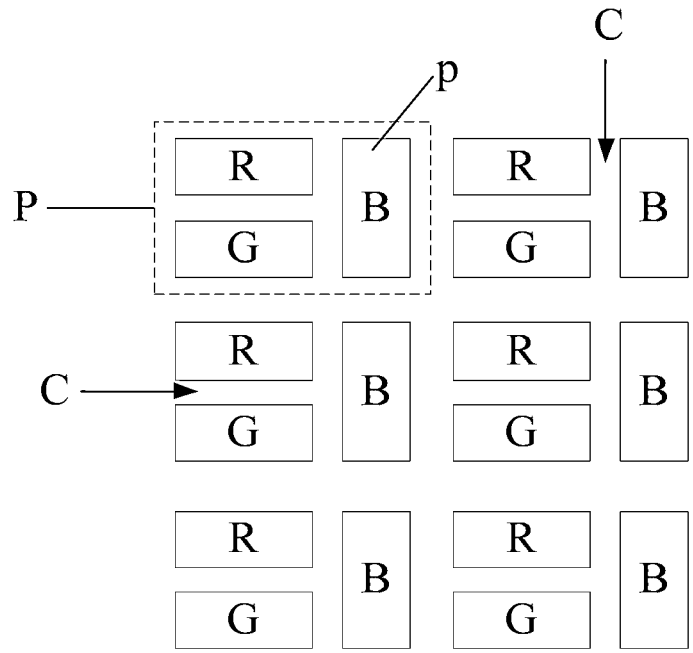
FIG. 5 is a schematic diagram illustrating another arrangement of sub-pixels according to embodiments of the disclosure.

FIG. 5 is a schematic diagram of another arrangement of the sub-pixels in embodiments of the disclosure. As shown in FIG. 5, the sub-pixels in the above flexible touch substrate may be arranged in a matrix. The above flexible touch substrate includes a plurality of pixels P arranged in an array. Each pixel P includes three sub-pixels p, which are respectively a red sub-pixel R, a green sub-pixel G, and a blue sub-pixel B. In each pixel P, two sub-pixels p (for example, the red sub-pixel R and the green sub-pixel G) are arranged in one column, and the third sub-pixel p (for example, the blue sub-pixel B) is arranged in another column. A position region between two adjacent sub-pixels p is a sub-pixel gap C.

Figure 6:
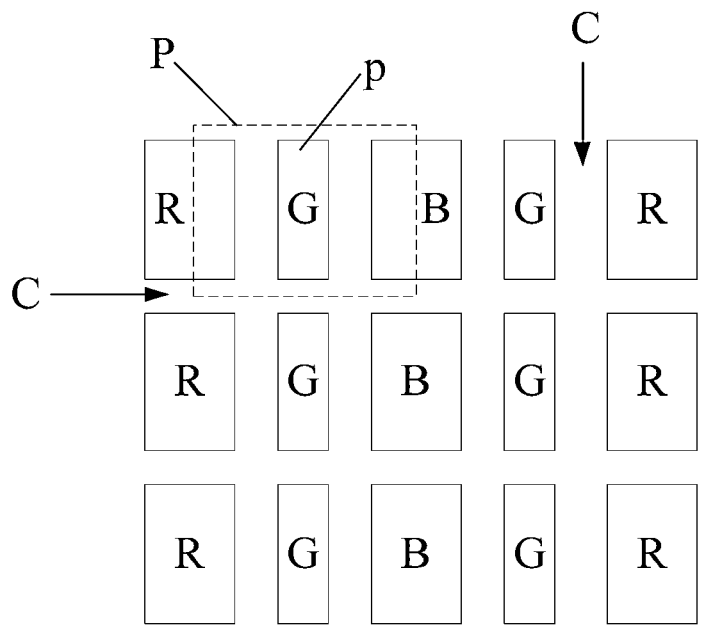
FIG. 6 is a schematic diagram illustrating yet another arrangement of sub-pixels according to embodiments of the disclosure.

FIG. 6 is a schematic diagram of yet another arrangement of the sub-pixels in embodiments of the disclosure. As shown in FIG. 6, the sub-pixels in the above flexible touch substrate may be arranged in a shared manner. The above flexible touch substrate includes a plurality of pixels P arranged in an array. Each pixel P includes three sub-pixels p, which are a red sub-pixel R, a green sub-pixel G, and a blue sub-pixel B respectively. Each pixel P shares two sub-pixels p, for example, the red sub-pixel R and the blue sub-pixel B, with two adjacent pixels P thereof, and the third sub-pixel p (for example, the green sub-pixel G) in each pixel P is located between the two shared sub-pixels p. A region between two adjacent sub-pixels p is a sub-pixel gap C.

In some embodiments, in embodiments of the disclosure, referring to FIGS. 4 to 6, the orthographic projection of the pattern in the shielding layer on the flexible base substrate is located in a gap (namely a region corresponding to a sub-pixel gap C) between two adjacent light-emitting devices. In addition, the orthographic projection of the pattern in the touch electrode layer on the flexible base substrate may also be located in the sub-pixel gap C. In this way, the pattern of the shielding layer and the pattern of the touch electrode layer may be prevented from blocking the light emitted from the light-emitting devices and affecting the display effect.

Figure 7:
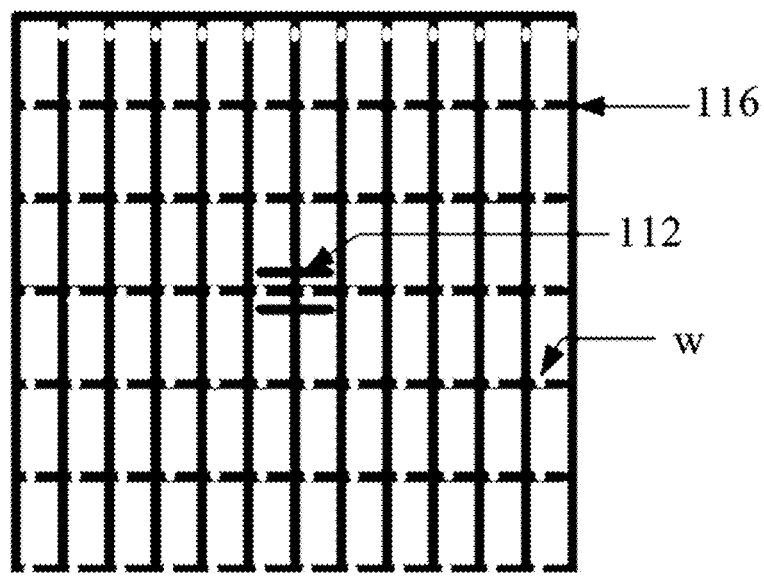
FIG. 7 is a schematic diagram illustrating a relationship between a shielding layer and bridging structures according to embodiments of the disclosure.

FIG. 7 is a schematic diagram illustrating a relationship between the shielding layer and the bridging structures in embodiments of the disclosure. As shown in FIG. 7, the bridging structures 112 are located in the center of FIG. 7, and the pattern of the shielding layer 116 surrounds the bridging structures 112. The above shielding layer is of a mesh structure composed of a plurality of shielding lines, and the openings in the shielding layer correspond to positions of the meshes of the grid structure in the touch electrode layer, so that the light emitted by the light-emitting devices can pass through the openings without affecting the display effect.

The mesh structure of shielding layer 116 has a plurality of disconnected positions w, and the disconnected positions w are positions where orthographic projections of grid lines of the grid structure in the touch electrode layer on the shielding layer pass through. The size of grids in the shielding layer may be equal or unequal, and may be set according to actual conditions, which is not limited here.

Figure 8:
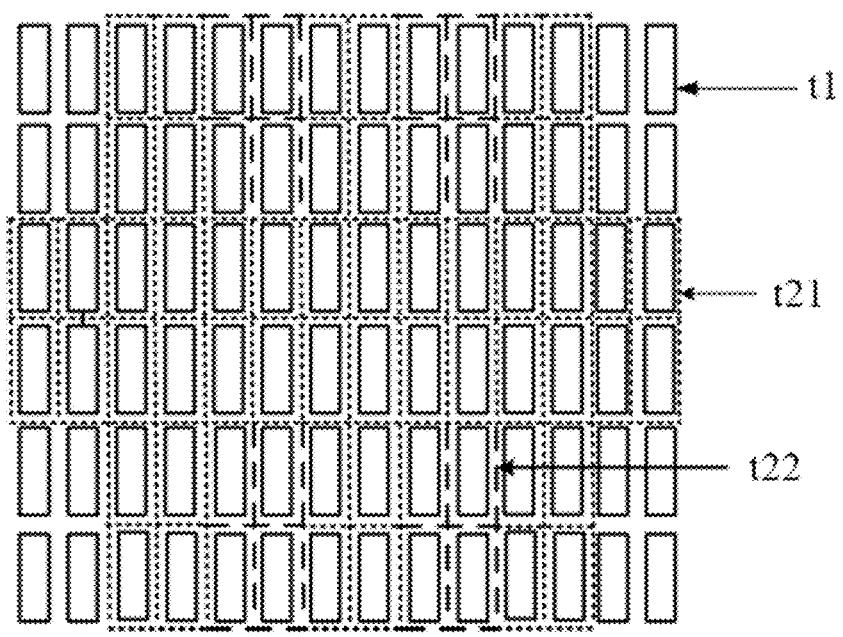
FIG. 8 is a schematic diagram showing an orthographic projection of a touch electrode layer on a shielding layer according to embodiments of the disclosure.

FIG. 8 is a schematic diagram of an orthographic projection of the touch electrode layer on the shielding layer in embodiments of the disclosure. As shown in FIG. 8, in another optional implementation manner, the shielding layer may include: a plurality of metal rings t1 arranged at intervals. The metal rings t1 are located in orthographic projections of grids of the grid structure in the touch electrode layer on the shielding layer. In the figure, t21 is orthographic projections of grids formed by the first touch electrodes in the touch electrode layer on the shielding layer, t22 is orthographic projections of grids formed by the second touch electrodes in the touch electrode layer on the shielding layer, and the metal rings t1 are located in the orthographic projections t21 and t22 of the grids in the touch electrode layer on the shielding layer. Through holes of the metal rings t1 are the openings of the shielding layer, and the light emitted by the light-emitting devices can pass through the openings without affecting the display effect.

In some embodiments, a width of the sub-pixel gaps may be about 20 μm, a width of the grid lines of the grid structure in the touch electrode layer may be about 3 μm, and a width of the shielding lines in the shielding layer may be about 3 μm. In this way, it may be ensured that orthographic projections of the grid lines of the grid structure in the touch electrode layer and orthographic projections of the shielding lines of the shielding layer on the light-emitting layer are located in the sub-pixel gaps, and orthographic projections of the pattern of the touch electrode layer and the pattern of the shielding layer in the sub-pixel gaps do not overlap each other. In some embodiments, the grid lines in the touch electrode layer and the shielding lines in the shielding layer may be located in middle positions of the sub-pixel gaps to prevent indirect light in the sub-pixels from being blocked and affecting the display effect.

Figure 9:
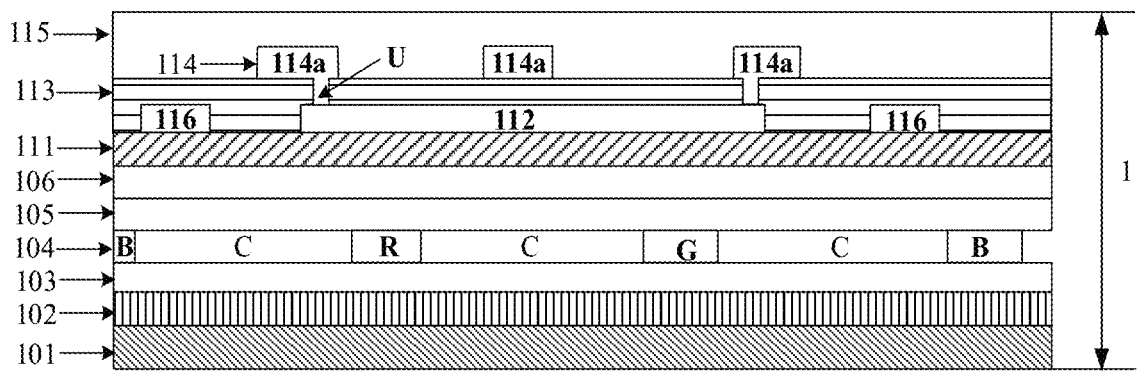
FIG. 9 is another cross-sectional view of a flexible touch substrate according to embodiments of the disclosure.
Figure 10:
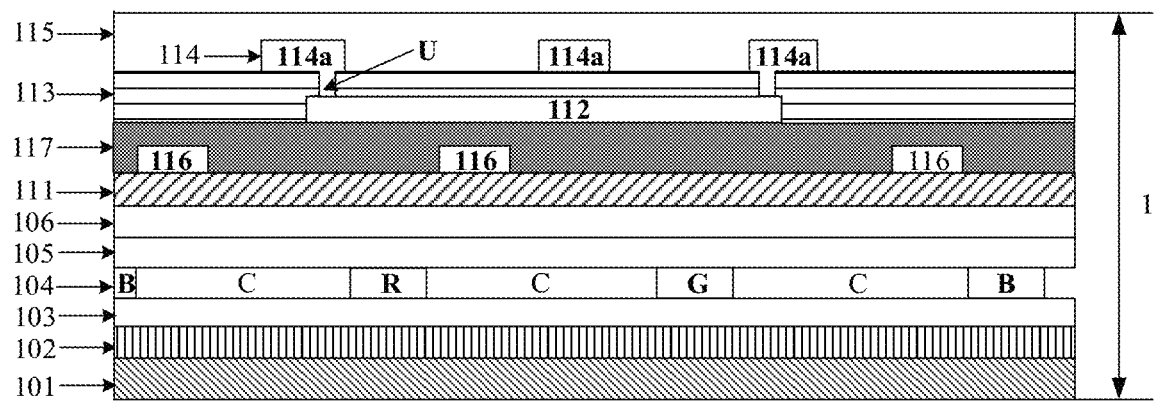
FIG. 10 is yet another cross-sectional view of a flexible touch substrate according to embodiments of the disclosure.

FIG. 9 is yet schematic cross-sectional view of the flexible touch substrate provided by embodiments of the disclosure. In the flexible touch substrate shown in FIG. 9, the shielding layer and the bridging structures are disposed on the same film layer. FIG. 10 is yet another cross-sectional view of the flexible touch substrate provided by embodiments of the disclosure. In the flexible touch substrate shown in FIG. 10, the shielding layer and the bridging structure are disposed in different film layers. As shown in FIGS. 9 and 10, in order to prevent the thin film encapsulation layer 106 from being damaged in the manufacturing process of the shielding layer 116, the flexible touch substrate may further include: a buffer layer 111 disposed on the side of the thin film encapsulation layer 106 facing away from the flexible base substrate, that is, the buffer layer 111 is disposed between the thin film encapsulation layer 106 and the shielding layer 116. In the manufacturing process of the shielding layer 116, the buffer layer 111 may protect the underlying thin film encapsulation layer 106 and prevent the thin film encapsulation layer 106 from being damaged.

Continuing to refer to FIGS. 9 and 10, the above flexible touch substrate provided by embodiments of the disclosure may further include: a protection layer 115 disposed on a side, facing away from the flexible base substrate 101, of the touch electrode layer 114. The protection layer 115 may play a protective role to prevent the flexible touch substrate from being damaged by external force.

In summary, the flexible touch substrate provided by embodiments of the disclosure may include: the flexible base substrate, the drive film layer, the light-emitting devices, the thin film encapsulation layer, the bridging structures, the first insulating layer, the touch electrode layer, the protection layer and other film layers. In addition, the shielding layer is disposed between the thin film encapsulation layer and the touch electrode layer, and the shielding layer can reduce the load capacitance between the touch electrode layer and the second electrode, and reduce the interference of the noise signal on the touch response of the flexible touch substrate. In addition, the shielding layer is provided with the openings, and the light emitted by the light-emitting devices can pass through the openings without affecting the display effect.

Figure 11:
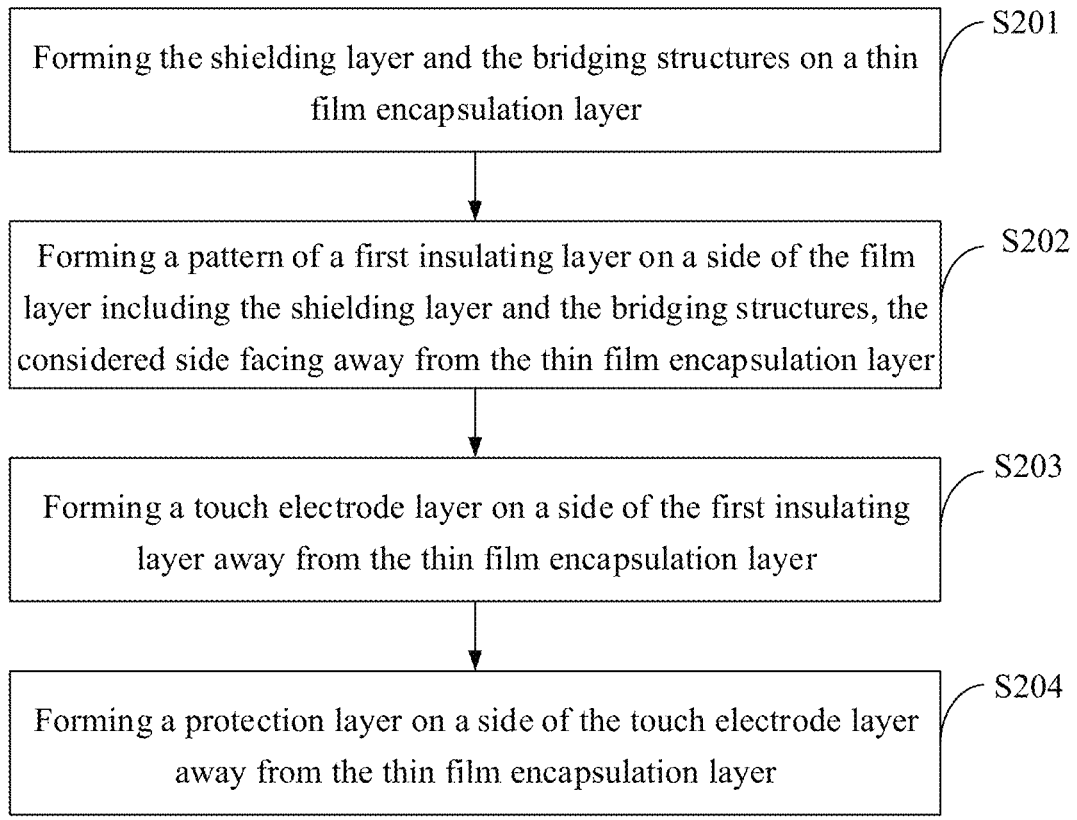
FIG. 11 is a flowchart of a manufacturing method of a flexible touch substrate according to embodiments of the disclosure.

An embodiment of the disclosure further provides a manufacturing method of a flexible touch substrate. The method may be applied to manufacturing of the flexible touch substrate as shown in FIG. 1 and FIG. 9 in which the shielding layer and the bridging structures are disposed on the same film layer. As shown in FIG. 11, the method may include the following.

S201, forming the shielding layer and the bridging structures on a thin film encapsulation layer.

In embodiments of the disclosure, a material of the shielding layer and the bridging structures may be a transparent conductive material or a metal material. The transparent conductive material may be Indium Tin Oxide (ITO), and the metal material may be titanium and aluminum. Before S201, the method may further include: forming a drive film layer, a first electrode, a light-emitting layer, a second electrode, the thin film encapsulation layer and other film layers on a flexible base substrate. The shielding layer and the bridging structures may be disposed in the same layer. An arrangement manner of sub-pixels in the flexible touch substrate may be any one of arrangement manners in FIGS. 4 to 6. A width of sub-pixel gaps may be about 20 μm.

Figure 12:
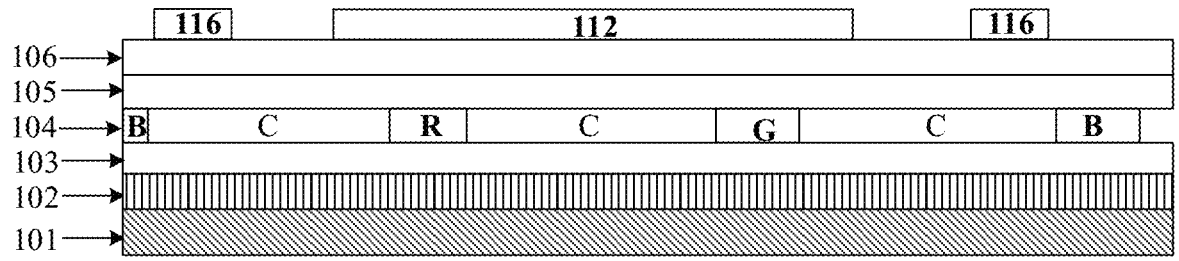
FIGS. 12 to 14 are schematic structural diagrams corresponding to steps of the manufacturing method shown in FIG. 11.
Figure 13:
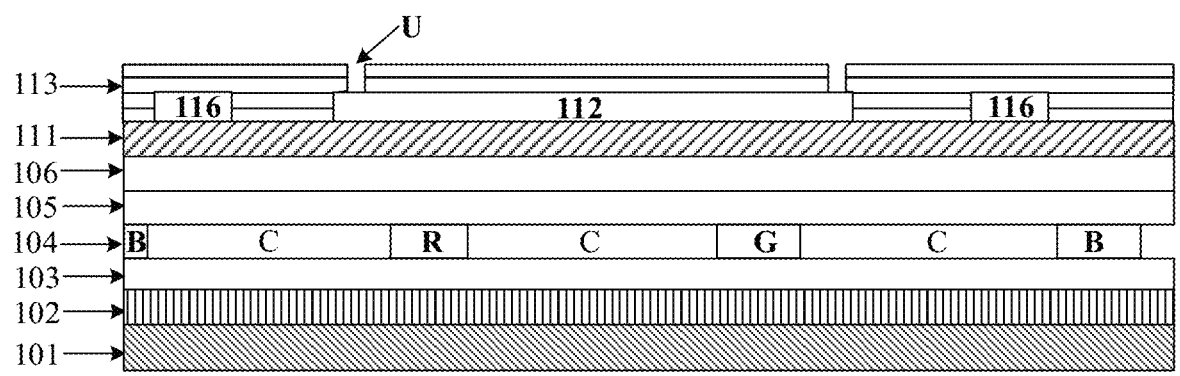
Figure 14:
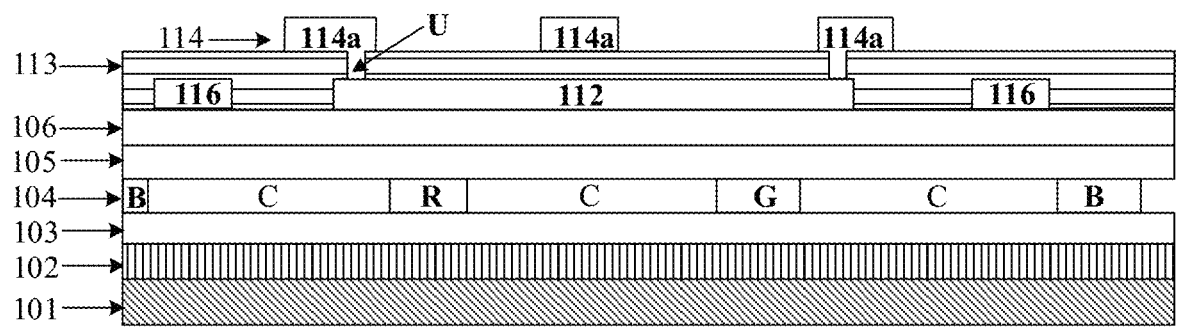

FIGS. 12 to 14 are schematic structural diagrams corresponding to the manufacturing method shown in FIG. 11. As shown in FIG. 12, in S201, when the shielding layer 116 and the bridging structures 112 are made of the transparent conductive material, a transparent conductive film layer may be formed on the thin film encapsulation layer 106 by a process such as coating or sputtering, and then the transparent conductive film layer is patterned to obtain a pattern of the shielding layer 116 and the bridging structures 112. When the shielding layer 116 and the bridging structures 112 are made of the metal material, a metal film layer may be formed on the thin film encapsulation layer 106 by a process such as deposition or sputtering, and then the metal film layer is patterned to obtain the pattern of the shielding layer 116 and the bridging structures 112. In some embodiments, the metal film layer may include three sub-metal film layers. For example, the metal film layer may include: a first sub-metal film layer made of titanium, a second sub-metal film layer made of aluminum, and a third sub-metal film layer made of titanium. In the manufacturing process, the metal film layer may be formed on the thin film encapsulation layer by sputtering for three times. In the first time and third time of sputtering, the first sub-metal film layer and the third sub-metal film layer are formed by using titanium, and in the second time of sputtering, the second sub-metal film layer is formed by using aluminum.

In some embodiments, the shielding layer 116 and the bridging structures 112 may be formed by using a one-time patterning process. When the shielding layer 116 and the bridging structures 112 are made of the transparent conductive material, the patterning process may be exposure and development processes. When the shielding layer 116 and the bridging structures 112 are made of the metal, the patterning process may be photoresist coating, exposure, development, etching, and photoresist peeling. Photoresist may also be pre-baked and post-baked before and after exposure. In some embodiments, the pattern of the shielding layer may be a structure as shown in FIG. 7, and a width of shielding lines may be about 3 µm. Through the one-time patterning process, the shielding layer and the bridging structures may be formed at one time instead of being separately manufactured, which may reduce the number of patterning processes in the manufacturing process of the flexible touch substrate and reduce the production cost.

S202, forming a pattern of a first insulating layer on a side of the film layer including the shielding layer and the bridging structures, the considered side facing away from the thin film encapsulation layer.

In embodiments of the disclosure, a material of the first insulating layer may be an organic material, such as a photosensitive over coat (OC) material with a dielectric constant being about 3.5. The thickness of the first insulating layer 113 may be in the range of 0.5 µm-3 µm, for example, the thickness of the first insulating layer 113 may be about 2 µm.

In S202, as shown in FIG. 13, the first insulating layer 113 may be formed on the side, away from the thin film encapsulation layer 106, of the film layer where the shielding layer 116 and the bridging structures 112 are located by using a coating process. In some embodiments, the side being away from the thin film encapsulation layer 106 of the film layer where the shielding layer 116 and the bridging structures 112 are located may be coated with an OC material of about 2 µm to form the first insulating layer 113.

In practical application, via holes U may be formed in the first insulating layer 113 by using a patterning process. When the first insulating layer is made of the organic material, the via holes may be formed by using exposure and development processes.

S203, forming a touch electrode layer on a side of the first insulating layer away from the thin film encapsulation layer.

In embodiments of the disclosure, a material of the touch electrode layer may be metal, for example, titanium and aluminum. The touch electrode layer may include first touch electrodes and second touch electrodes, that is, the touch electrode layer may be of a mutual capacitance structure. The touch electrode layer may be of a grid structure, and light emitted by light-emitting devices may pass through meshes of the grid structure. In addition, orthographic projections of grid lines in the touch electrode layer on the shielding layer do not overlap shielding lines in the shielding layer, which may prevent the shielding layer from forming load capacitances with the touch electrode layer and the second electrode respectively, and ensure that a load capacitance between the touch electrode layer and the second electrode is small, and interference to touch response of the flexible touch substrate is small.

In S203, as shown in FIG. 14, the touch electrode layer 114 may be made of the metal material. The touch electrode 114 may include three sub-metal film layers, which are respectively: a first sub-metal layer made of titanium, a second sub-metal film layer made of aluminum, and a third sub-metal film layer made of titanium. The touch electrode layer 114 may be formed on the side, away from the thin film encapsulation layer 106, of the first insulating layer 113 by using three times of deposition or sputtering. For example, the touch electrode layer 114 is formed on the thin film encapsulation layer by using three times of sputtering, where in the first time and third time of sputtering, the first sub-metal film layer and the third sub-metal film layer are formed by using titanium, and in the second time of sputtering, the second sub-metal film layer is formed by using aluminum.

Further, a plurality of touch electrodes 114a in the touch electrode layer 114 may be formed by using a one-time patterning process, and a part of the touch electrodes 114a in the touch electrode layer 114 are coupled with the bridging structures 112 through via holes U in the first insulating layer 113. In some embodiments, the patterning process of the touch electrode layer 114 may include: photoresist coating, exposure, development, etching, and photoresist peeling. Photoresist may also be pre-baked and post-baked before and after exposure. The touch electrodes 114a are of a grid structure, and a width of grid lines thereof may be about 3 µm.

S204, forming a protection layer on a side of the touch electrode layer away from the thin film encapsulation layer.

In step S204 above, the protection layer 115 may be formed on the side of the touch electrode layer 114 away from the thin film encapsulation layer 106, by using a coating process, and a structure of the formed flexible touch substrate may be as shown in FIG. 1.

In some embodiments, before S201 is performed, the method may further include: forming a buffer layer on the thin film encapsulation layer. A material of the buffer layer may be an inorganic material or an organic material, such as SiNx. The buffer layer 111 may be formed on the thin film encapsulation layer 106 by using a CVD process, and a structure of the formed flexible touch substrate may be as shown in FIG. 9.

In summary, the manufacturing method of the flexible touch substrate provided by embodiments of the disclosure can form the shielding layer and the bridging structures on the thin film encapsulation layer, the shielding layer and the bridging structures are disposed in the same layer, the shielding layer is provided with the openings, and the light emitted by the light-emitting devices can pass through the openings. The first insulating layer is formed on the side of the film layer including the shielding layer and the bridging structures away from the thin film encapsulation layer. The touch electrode layer is formed on the side of the first insulating layer away from the thin film encapsulation layer. The protection layer is formed on the side of the touch electrode layer away from the thin film encapsulation layer. The shielding layer is formed between the thin film encapsulation layer and the touch electrode layer of the flexible touch substrate, so the load capacitance between the second electrode and the touch electrode layer can be reduced, the interference of the noise signal on the touch response of the flexible touch substrate can be reduced, and the display effect cannot be affected.

Figure 15:
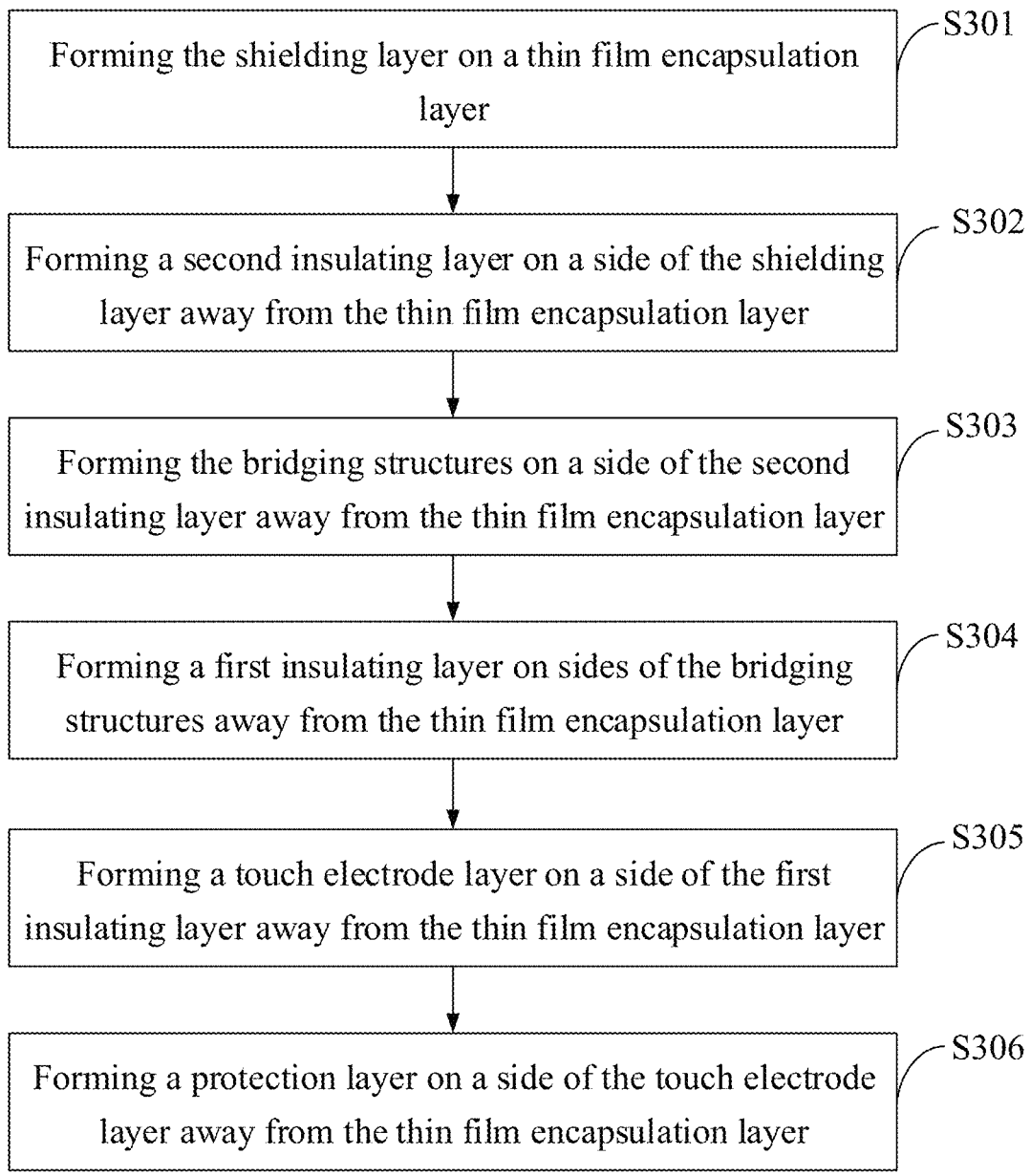
FIG. 15 is a flowchart of another manufacturing method of a flexible touch substrate according to embodiments of the disclosure.

An embodiment of the disclosure further provides another manufacturing method of a flexible touch substrate. The method may be applied to manufacturing of the flexible touch substrate as shown in FIG. 3 or FIG. 10. A shielding layer and bridging structures in the flexible touch substrate are located in different film layers. As shown in FIG. 15, the method may include the following.

S301, forming the shielding layer on a thin film encapsulation layer.

In embodiments of the disclosure, a material of the shielding layer may be a transparent conductive material or a metal material. The transparent conductive material may be Indium Tin Oxide (ITO), and the metal material may be titanium and aluminum. Before S201 above, the method may further include: a drive film layer, a first electrode, a light-emitting layer, a second electrode, the thin film encapsulation layer and other film layers are formed on a flexible base substrate. An arrangement manner of sub-pixels in the flexible touch substrate may be any one of arrangement manners in FIGS. 4 to 6. A width of sub-pixel gaps may be about 20 μm.

Figure 16:
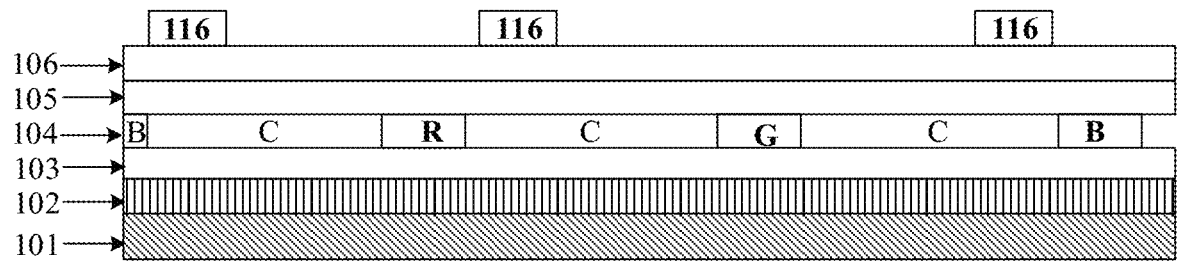
FIGS. 16 to 20 are schematic structural diagrams corresponding to steps of the manufacturing method shown in FIG. 15.

FIGS. 16 to 20 are schematic structural diagrams corresponding to steps of the manufacturing method shown in FIG. 15. As shown in FIG. 16, in S301, when the shielding layer 116 is made of the transparent conductive material, a transparent conductive film layer may be formed on the thin film encapsulation layer 106 by a process such as coating or sputtering, and then the transparent conductive film layer is patterned to obtain a pattern of the shielding layer 116. When the shielding layer 116 is made of the metal material, a metal film layer may be formed on the thin film encapsulation layer 106 by a process such as deposition or sputtering, and then the metal film layer is patterned to obtain the pattern of the shielding layer 116. In some embodiments, the metal film layer may include three sub-metal film layers. For example, the metal film layer may include: a first sub-metal film layer made of titanium, a second sub-metal film layer made of aluminum, and a third sub-metal film layer made of titanium. In the manufacturing process, the metal film layer may be formed on the thin film encapsulation layer by using three times of sputtering. In the first time and third time of sputtering, the first sub-metal film layer and the third sub-metal film layer are formed by using titanium, and in the second time of sputtering, the second sub-metal film layer is formed by using aluminum.

In some embodiments, the shielding layer 116 may be formed by using a one-time patterning process. When the shielding layer 116 is made of the transparent conductive material, the patterning process may be exposure and development processes. When the shielding layer 116 is made of the metal material, the patterning process may be photoresist coating, exposure, development, etching, and photoresist stripping. Photoresist may also be pre-baked and post-baked before and after exposure. In some embodiments, the pattern of the shielding layer may be a structure as shown in FIG. 8, and a width of shielding lines may be about 3 μm.

S302, forming a second insulating layer on a side of the shielding layer away from the thin film encapsulation layer.

In embodiments of the disclosure, a material of the second insulating layer may be an organic material, such as a photosensitive Over Coat (OC) material, or an inorganic material, such as silicon nitride (SiNx). When the material of the second insulating layer is the inorganic material, a thickness of the second insulating layer may be 0.3 μm-0.4 μm, and when the material of the second insulating layer is the organic material, the thickness of the second insulating layer may be about 2 μm.

Figure 17:
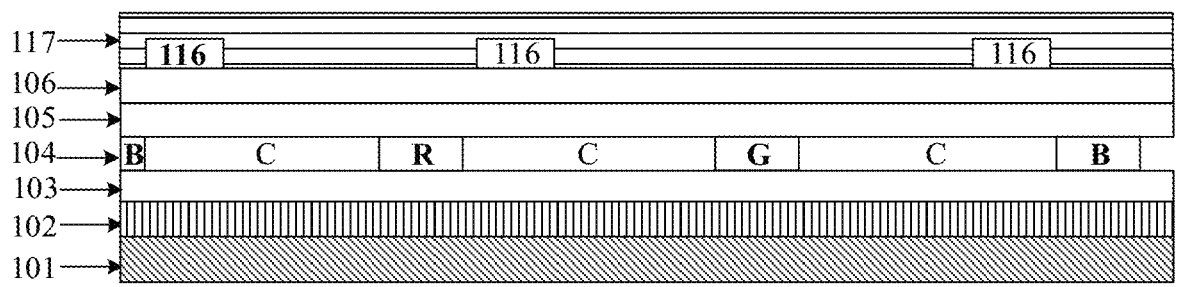

In S302, as shown in FIG. 17, when the second insulating layer 117 is made of the organic material, the second insulating layer 117 may be formed on the side of the shielding layer 116 away from the thin film encapsulation layer 106 by using a coating process. When the second insulating layer 117 is made of the inorganic material, the second insulating layer 117 may be formed on the side of the shielding layer 116 away from the thin film encapsulation layer 106 by using a chemical vapor deposition (CVD) process.

S303, forming the bridging structures on a side of the second insulating layer away from the thin film encapsulation layer.

In embodiments of the disclosure, a material of the bridging structures may be a transparent conductive material or a metal material. The transparent conductive material may be indium tin oxide (ITO), and the metal material may be titanium and aluminum.

Figure 18:
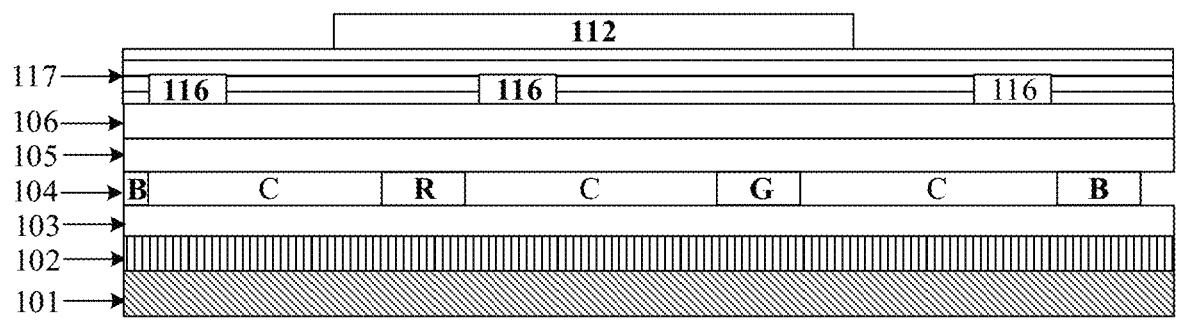

In S303, as shown in FIG. 18, when the bridging structures 112 are made of the transparent conductive material, a transparent conductive film layer may be formed on the side of the second insulating layer 117 away from the thin film encapsulation layer 106 by a process such as coating or sputtering, and then the transparent conductive film layer is patterned to obtain the bridging structures 112. When the bridging structures 112 are made of the metal material, a metal film layer may be formed on the side of the second insulating layer 117 away from the thin film encapsulation layer 106 by a process such as deposition or sputtering, and then the metal film layer is patterned to obtain the bridging structures 112. In some embodiments, the metal film layer may include three sub-metal film layers. For example, the metal film layer may include: a first sub-metal film layer made of titanium, a second sub-metal film layer made of aluminum, and a third sub-metal film layer made of titanium. In the manufacturing process, the metal film layer may be formed on the thin film encapsulation layer by using three times of sputtering. In the first time and third time of sputtering, the first sub-metal film layer and the third sub-metal film layer are formed by using titanium, and in the second time of sputtering, the second sub-metal film layer is formed by using metal aluminum.

In some embodiments, the bridging structures 112 may be formed by using a one-time patterning process. When the bridging structures 112 are made of the transparent conductive material, the patterning process may be exposure and development processes. When the bridging structures 112 are made of the metal material, the patterning process may be photoresist coating, exposure, development, etching, and photoresist stripping. Photoresist may also be pre-baked and post-baked before and after exposure.

S304, forming a first insulating layer on sides of the bridging structures away from the thin film encapsulation layer.

In embodiments of the disclosure, a material of the first insulating layer may be an organic material, such as a photosensitive Over Coat (OC) material, or an inorganic material, such as silicon nitride (SiNx). When the material of the first insulating layer is the inorganic material, a thickness of the first insulating layer may be 0.3 μm-0.4 μm, and when the material of the first insulating layer is the organic material, the thickness of the first insulating layer may be about 2 μm.

Figure 19:
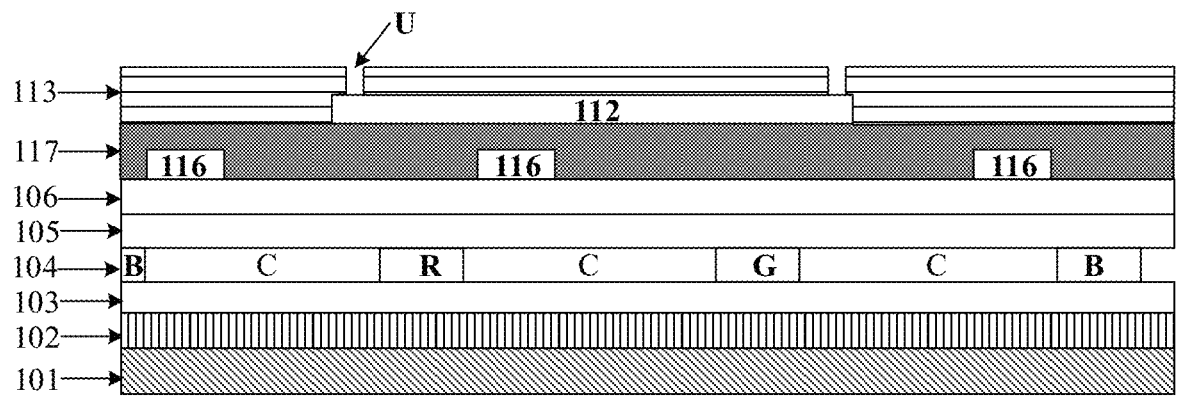
Figure 20:
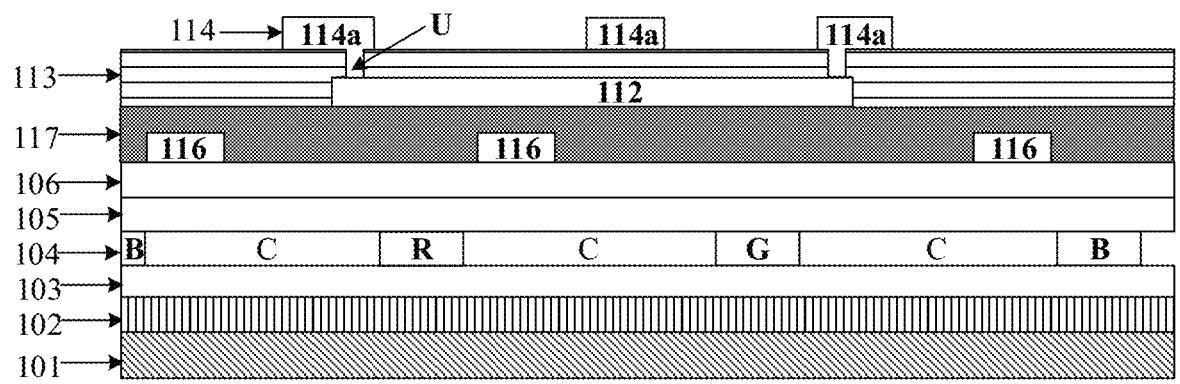

In S304, as shown in FIG. 19, when the first insulating layer 113 is made of the organic material, the first insulating layer 113 may be formed on a side of a film layer including the shielding layer 116 and the bridging structures 112 away from the thin film encapsulation layer 106, by using a coating process. When the first insulating layer 113 is made of the inorganic material, the first insulating layer 113 may be formed on the side of the film layer including the shielding layer 116 and the bridging structures 112 away from the thin film encapsulation layer 106, by using a chemical vapor deposition (CVD) process. In some embodiments, the side, away from the thin film encapsulation layer 106, of the film layer where the shielding layer 116 and the bridging structures 112 are located may be coated with an OC material of about 2 μm to form the first insulating layer 113.

Further, via holes U may be formed in the first insulating layer 113 by using a patterning process. When the first insulating layer is made of the organic material, the via holes may be formed by using exposure and development processes. When the first insulating layer is made of the inorganic material, the via holes may be formed by using processes of photoresist coating, exposure, development, etching and photoresist stripping.

S305, forming a touch electrode layer on a side of the first insulating layer away from the thin film encapsulation layer.

The specific process of step S305 may refer to S203 above, which will not be repeated here. A structure obtained in S305 may refer to FIG. 20.

S306, forming a protection layer on a side of the touch electrode layer away from the thin film encapsulation layer.

The specific process of S306 may refer to S204 above, which will not be repeated here. A structure obtained in S306 may refer to FIG. 4.

In some embodiments, before S301 is performed, the method may further include: forming a buffer layer on the thin film encapsulation layer. A material of the buffer layer may be an inorganic material, such as SiNx. The buffer layer 111 may be formed on the thin film encapsulation layer 106 by a CVD process. A structure of the formed flexible touch substrate is as shown in FIG. 10.

In summary, the manufacturing method of the flexible touch substrate provided by embodiments of the disclosure can form the shielding layer on the thin film encapsulation layer, the shielding layer is provided with openings, and light emitted by light-emitting devices can pass through the openings. The second insulating layer is formed on the side of the shielding layer away from the thin film encapsulation layer. The bridging structures are formed on the side of the second insulating layer away from the thin film encapsulation layer. The first insulating layer is formed on the sides of the bridging structures away from the thin film encapsulation layer. The touch electrode layer is formed on the side, away from the thin film encapsulation layer, of the first insulating layer. The protection layer is formed on the side, away from the thin film encapsulation layer, of the touch electrode layer. The shielding layer is formed between the thin film encapsulation layer and the touch electrode layer of the flexible touch substrate, so a load capacitance between the second electrode and the touch electrode layer can be reduced, interference of a noise signal to touch response of the flexible touch substrate can be reduced, and the display effect cannot be affected.

Figure 21:
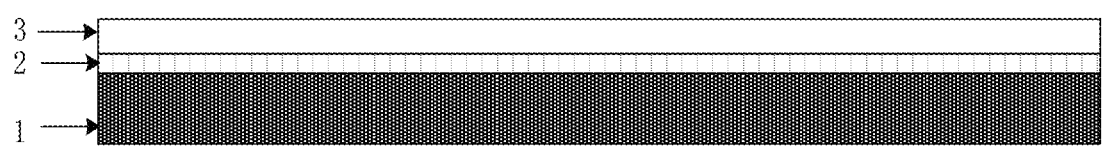
FIG. 21 is a schematic structural diagram of a flexible touch panel according to embodiments of the disclosure.

Based on the same inventive concept, an embodiment of the disclosure further provides a flexible touch panel. As shown in FIG. 21, the flexible touch panel may include: the flexible touch substrate 1 provided by embodiments of the disclosure, a polarizer 2 and a transparent cover plate 3. The polarizer 2 is disposed on a side of a touch electrode layer of the flexible touch substrate away from a flexible base substrate. The transparent cover plate 3 is disposed on a side of the polarizer 2 away from the flexible touch substrate 1.

In some embodiments, the transparent cover plate may be a three-dimensional (3D) cover plate, such as a curved cover plate. Or, the transparent cover plate may also be a planar cover plate.

In summary, in the flexible touch panel provided by embodiments of the disclosure, the polarizer may be disposed on a protection layer of the flexible touch substrate, and the transparent cover plate may be disposed on the side of the polarizer to form the flexible touch panel away from the flexible touch substrate. In the flexible touch panel, a shielding layer is disposed between a thin film encapsulation layer and the touch electrode layer of the flexible touch substrate, so the load capacitance between a second electrode and the touch electrode layer can be reduced, and interference of a noise signal to touch response of the flexible touch substrate can be reduced.

Based on the same inventive concept, an embodiment of the disclosure further provides a flexible touch apparatus. The flexible touch apparatus may be any touch display device such as a TV, a mobile phone, a computer monitor, or an e-reader. A flexible touch panel of the flexible touch apparatus may be any flexible touch panel in the above embodiment, or a flexible touch substrate of the flexible touch apparatus may be any flexible touch substrate in the above embodiments.

In some embodiments, a light-emitting device in the flexible touch apparatus may be an organic light-emitting diode or a source matrix organic light-emitting diode or the like. The light-emitting device may include a first electrode, a light-emitting layer and a second electrode. The first electrode is an anode and the second electrode is a cathode, or the first electrode is a cathode and the second electrode is an anode. In some embodiments, the light-emitting device may further include a hole inject layer and a hole transport layer which are disposed between the anode and the light-emitting layer, and an electron transport layer and an electron inject layer which are disposed between the cathode and the light-emitting layer.

The foregoing description is only illustrative of the preferred embodiments of the disclosure and of the principles of the technology employed. It should be understood by those skilled in the art that the scope of disclosure referred to in the disclosure is not limited to technical solutions formed by particular combinations of the technical features described above, but is intended to cover other technical solutions formed by arbitrarily combining the technical features described above or their equivalents without departing from the concept of the disclosure, for example, technical solutions formed by interchanging the technical features described above and the technical features having similar functions disclosed (but not limited to) in the disclosure.

What is claimed is:

1. A flexible touch substrate, comprising:
    a flexible base substrate;
    a plurality of light-emitting devices, on the flexible base substrate;
    a touch electrode layer, disposed on a side of the plurality of light-emitting devices facing away from the flexible base substrate, and being provided with a pattern; and
    a shielding layer, between the touch electrode layer and the plurality of light-emitting devices;
    wherein the shielding layer is insulated from the plurality of light-emitting devices and the touch electrode layer and comprises a transparent conductive material or a metal material; and
    the shielding layer is provided with a pattern with a plurality of openings to allow light beams emitted by the plurality of light-emitting devices to pass through the openings.

2. The flexible touch substrate according to claim 1, wherein the shielding layer is floating.

3. The flexible touch substrate according to claim 1, further comprising:

a thin film encapsulation layer covering the plurality of light-emitting devices, wherein
the shielding layer is disposed on a side of the thin film encapsulation layer facing away from the flexible base substrate.

4. The flexible touch substrate according to claim 3, further comprising:
a plurality of bridging structures between the touch electrode layer and the thin film encapsulation layer, and
a first insulating layer between the touch electrode layer and the bridging structures, wherein
the touch electrode layer comprises: a plurality of touch electrodes, and a part of the touch electrodes in the touch electrode layer are coupled with each other through the plurality of bridging structures;
the first insulating layer comprises: a plurality of via holes running through a thickness direction of the first insulating layer; and
the plurality of bridging structures are coupled with the touch electrodes through the via holes.

5. The flexible touch substrate according to claim 4, wherein the shielding layer and the bridging structures are disposed in a same layer and are made of a same material.

6. The flexible touch substrate according to claim 5, wherein
the first insulating layer comprises an organic material; and
a thickness of the first insulating layer is within a range of 0.5 µm-3 µm.

7. The flexible touch substrate according to claim 4, wherein
the shielding layer is disposed between the thin film encapsulation layer and the bridging structures; and
the flexible touch substrate further comprises:
a second insulating layer between the shielding layer and the bridging structures.

8. The flexible touch substrate according to claim 3, further comprising:
a buffer layer disposed on a side of the thin film encapsulation layer facing away from the flexible base substrate.

9. The flexible touch substrate according to claim 1, wherein the touch electrode layer is of a grid structure, and meshes of the grid structure allow the light beams emitted by the plurality of light-emitting devices to pass through; and
an orthographic projection of the pattern of the touch electrode layer on the flexible base substrate and an orthographic projection of the pattern of the shielding layer on the flexible base substrate do not overlap each other.

10. The flexible touch substrate according to claim 9, wherein the shielding layer is of a mesh structure; and
the mesh structure has a plurality of disconnected positions, and the disconnected positions are positions where orthographic projections of grid lines of the grid structure in the touch electrode layer on the shielding layer pass through.

11. The flexible touch substrate according to claim 9, wherein the shielding layer comprises:
a plurality of metal rings arranged at intervals; and
the plurality of metal rings are located respectively in orthographic projections of meshes of the grid structure in the touch electrode layer on the shielding layer.

12. The flexible touch substrate according to claim 1, wherein an orthographic projection of the pattern of the shielding layer on the flexible base substrate is located in a gap between two adjacent light-emitting devices of the plurality of light-emitting devices.

13. The flexible touch substrate according to claim 1, further comprising:
a protection layer disposed on a side of the touch electrode layer facing away from the flexible base substrate.

14. A flexible touch panel, comprising:
a flexible touch substrate;
a polarizer, disposed on a side of a touch electrode layer of the flexible touch substrate facing away from a flexible base substrate; and
a transparent cover plate, disposed on a side of the polarizer away from the flexible touch substrate;
wherein the flexible touch substrate comprises:
the flexible base substrate;
a plurality of light-emitting devices, on the flexible base substrate;
the touch electrode layer, disposed on a side of the plurality of light-emitting devices facing away from the flexible base substrate, and being provided with a pattern; and
a shielding layer, between the touch electrode layer and the plurality of light-emitting devices;
wherein the shielding layer is insulated from the plurality of light-emitting devices and the touch electrode layer and comprises a transparent conductive material or a metal material; and
the shielding layer is provided with a pattern with a plurality of openings to allow light beams emitted by the plurality of light-emitting devices to pass through the openings.

15. The flexible touch panel according to claim 14, wherein the shielding layer is floating.

16. The flexible touch panel according to claim 15, further comprising:
a thin film encapsulation layer covering the plurality of light-emitting devices, wherein
the shielding layer is disposed on a side of the thin film encapsulation layer facing away from the flexible base substrate.

17. The flexible touch panel according to claim 14, wherein an orthographic projection of the pattern of the shielding layer on the flexible base substrate is located in a gap between two adjacent light-emitting devices of the plurality of light-emitting devices.

18. A flexible touch apparatus, comprising the flexible touch panel according to claim 14.

19. A flexible touch apparatus, comprising a flexible touch substrate,
wherein the flexible touch substrate comprises:
a flexible base substrate;
a plurality of light-emitting devices, on the flexible base substrate;
a touch electrode layer, disposed on a side of the plurality of light-emitting devices facing away from the flexible base substrate, and being provided with a pattern; and
a shielding layer, between the touch electrode layer and the plurality of light-emitting devices;
wherein the shielding layer is insulated from the plurality of light-emitting devices and the touch electrode layer and comprises a transparent conductive material or a metal material; and
the shielding layer is provided with a pattern with a plurality of openings to allow light beams emitted by the plurality of light-emitting devices to pass through the openings.

* * * * *